US012687272B2

(12) United States Patent
Gromfeld et al.

(10) Patent No.: US 12,687,272 B2
(45) Date of Patent: Jul. 21, 2026

(54) MOTOR VEHICLE HEADLIGHT THAT CAN BE MODULARIZED BETWEEN RIGHT-HAND DRIVE AND LEFT-HAND DRIVE

(71) Applicant: VALEO VISION, Bobigny (FR)

(72) Inventors: Yves Gromfeld, Bobigny (FR); Corentin Debaine, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 19/078,922

(22) Filed: Mar. 13, 2025

(65) Prior Publication Data

US 2025/0207750 A1 Jun. 26, 2025

Related U.S. Application Data

(63) Continuation of application No. 18/404,405, filed on Jan. 4, 2024, now abandoned, which is a continuation (Continued)

(30) Foreign Application Priority Data

Oct. 29, 2019 (FR) ...................................... 1912144

(51) Int. Cl.
*F21S 41/62* (2018.01)
*F21S 41/148* (2018.01)

(Continued)

(52) U.S. Cl.
CPC ............. *F21S 41/62* (2018.01); *F21S 41/148* (2018.01); *F21S 41/24* (2018.01); *F21S 41/321* (2018.01)

(58) Field of Classification Search
CPC .......... F21S 41/24; F21S 41/62; F21S 41/321; F21S 41/322; F21S 41/663; F21S 41/255; F21S 41/36; F21W 2102/155
See application file for complete search history.

(56) References Cited

U.S. PATENT DOCUMENTS 8,197,109 B2 6/2012 Iwasaki
10,451,238 B2 10/2019 Meyrenaud et al.

(Continued)

FOREIGN PATENT DOCUMENTS

CN 108473082 A 8/2018
CN 108633296 A 10/2018

(Continued)

OTHER PUBLICATIONS

European Patent Office, International Search Report (with English translation) and Written Opinion of corresponding international Application No. PCT/EP2020/078940, dated Jan. 15, 2021.

(Continued)

*Primary Examiner* — Zheng Song
(74) *Attorney, Agent, or Firm* — Valeo Vision

(57) ABSTRACT

The invention relates to a lighting module, in particular for a motor vehicle, including a main optical system able to form a main light beam along an optical axis of the lighting module, with an upper horizontal cut-off. A first complementary optical system able to form a first complementary light beam along the optical axis, narrower than the main light beam and with an oblique lateral cut-off. A second complementary optical system able to form an alternative, second complementary light beam along the optical axis, narrower than the main light beam and with an oblique lateral cut-off opposite the oblique lateral cut-off of the first complementary light beam.

18 Claims, 3 Drawing Sheets

Related U.S. Application Data of application No. 17/772,406, filed as application No. PCT/EP2020/078940 on Oct. 14, 2020, now abandoned.

(51) Int. Cl.
*F21S 41/24* (2018.01)
*F21S 41/32* (2018.01)

(56) References Cited

U.S. PATENT DOCUMENTS

| | | | | |
|---|---|---|---|---|
| 10,690,309 | B2 | 6/2020 | Gromfeld | |
| 10,752,162 | B2 | 8/2020 | Gutjahr et al. | |
| 10,801,687 | B2 | 10/2020 | Laminette et al. | |
| 11,333,313 | B2 | 5/2022 | Zhu | |
| 11,698,175 | B2 * | 7/2023 | Vogelauer | F21S 41/143 362/459 |
| 11,708,954 | B2 | 7/2023 | Sato et al. | |
| 2005/0141227 | A1 | 6/2005 | Tsukamoto | |
| 2008/0198574 | A1 | 8/2008 | Woodward | |
| 2012/0039083 | A1 | 2/2012 | Meyrnaud | |
| 2013/0141928 | A1 * | 6/2013 | Puente | F21S 41/692 362/235 |
| 2015/0124472 | A1 | 5/2015 | Wintzer | |
| 2016/0040848 | A1 | 2/2016 | Tsukamoto | |
| 2016/0363283 | A1 * | 12/2016 | Yamamoto | F21S 41/148 |
| 2017/0299137 | A1 * | 10/2017 | Kinoshita | F21S 41/147 |
| 2018/0058651 | A1 | 3/2018 | Gromfeld | |
| 2018/0180246 | A1 | 6/2018 | Na | |
| 2019/0086050 | A1 | 3/2019 | Dikau | |
| 2021/0310628 | A1 * | 10/2021 | Li | F21S 41/285 |
| 2022/0107066 | A1 | 4/2022 | Sato et al. | |

FOREIGN PATENT DOCUMENTS

| | | | |
|---|---|---|---|
| CN | 110006003 | A | 7/2019 |
| DE | 102015215200 | A1 | 2/2016 |
| EP | 1357333 | A2 | 10/2003 |
| EP | 2762772 | A1 | 8/2014 |
| EP | 3290777 | A1 | 3/2018 |
| FR | 2903946 | A1 | 1/2008 |
| FR | 2944578 | A1 | 10/2010 |
| JP | 2007035637 | A | 2/2007 |
| JP | 2007317604 | A | 12/2007 |
| JP | 2011003515 | A | 1/2011 |
| JP | 2013054902 | A | 3/2013 |
| JP | 2013242996 | A | 12/2013 |
| JP | 2015230769 | A | 12/2015 |
| JP | 2019036564 | A | 3/2019 |
| WO | 2021106184 | A1 | 6/2021 |
| WO | 2021261559 | A1 | 12/2021 |

OTHER PUBLICATIONS

Japan Patent Office, Search Report (with English translation) of corresponding Patent Application No. JP2022-525519, dated May 31, 2023.

Japan Patent Office, Office Action (with English translation) of corresponding Patent Application No. JP2022-525519, dated Jun. 13, 2023.

China Patent Office, Office Action (with English translation) and Search Report of corresponding Patent Application No. CN202080076746.4, dated Dec. 26, 2023.

* cited by examiner

MOTOR VEHICLE HEADLIGHT THAT CAN BE MODULARIZED BETWEEN RIGHT-HAND DRIVE AND LEFT-HAND DRIVE

TECHNICAL FIELD

The invention relates to the field of lighting, in particular lighting for a motor vehicle.

BACKGROUND OF THE INVENTION

The night-time lighting function of a motor vehicle with traffic coming in the opposite direction, normally called low beam, has an upper cut-off in accordance with applicable regulations. European regulations however require an upper horizontal cut-off with an oblique portion to the center of the beam, such that a left or right half of the light beam has a lower horizontal cut-off than the other half. More particularly, for countries which drive on the right, i.e. where the driving controls are on the left of the vehicle, the left half of the light beam is lower than the right half. Conversely, for countries which drive on the left, i.e. where the driving controls are on the right of the vehicle, the left half of the light beam is higher than the right half. American regulations however require in particular a flat upper horizontal cut-off, i.e. without oblique portion. This means that motor vehicle headlights must be configured differently according to territory.

Published patent document US2018180246 A1 discloses a motor vehicle headlight comprising a screen which is arranged in the optical path of the light rays, forming a light beam with cut-off, and the transmittance of which is variable locally, such as for example a liquid crystal display (LCD). More particularly, the pixels of this screen can be controlled specifically to create the above-mentioned horizontal cut-offs for driving on the left and driving on the right respectively, i.e. with opposing central oblique portions. In other words, this teaching provides a configuration by electrical control of the headlight for different regulations, in particular for driving on the left and driving on the right. However, the presence of the screen with locally variable transmittance is costly and also has the drawback of generating significant light losses due to the limited maximum transmittance.

SUMMARY OF THE INVENTION

The object of the invention is a lighting module, in particular for a motor vehicle, comprising a main optical system able to form a main light beam along an optical axis of the lighting module, with an upper horizontal cut-off; a first complementary optical system able to form a first complementary light beam along the optical axis, narrower than the main light beam and with an oblique lateral cut-off; which is distinguished in that the lighting module also comprises a second complementary optical system able to form an alternative, second complementary light beam along the optical axis, narrower than the main light beam and with an oblique lateral cut-off opposite the oblique lateral cut-off of the first light beam.

The main light beam combined with the first complementary light beam corresponds to a lighting function with cut-off with addition for driving on the right. The main light beam combined with the second complementary light beam corresponds to a lighting function with cut-off with addition for driving on the left.

According to an advantageous embodiment of the invention, the oblique lateral cut-offs of the first and second complementary light beams are adjacent to the optical axis, the first complementary light beam extending exclusively to the right of said optical axis and the second complementary light beam extending exclusively to the left of said optical axis.

According to an advantageous embodiment of the invention, the lighting module is configured such that the first and second optical systems are only active alternatively.

According to an advantageous embodiment of the invention, each of the first and second complementary light beams also has an upper horizontal cut-off and/or a lower horizontal cut-off.

According to an advantageous embodiment of the invention, each of the first and second complementary optical systems comprises a light source and an optical element with a surface able to be illuminated by said light source, and the lighting module comprises a device for projecting the first and second complementary light beams, which is configured to form an image of the illuminated surface of the optical element of each of the first and second complementary optical systems.

According to an advantageous embodiment of the invention, the surfaces able to be illuminated of the first and second complementary optical systems are arranged laterally on either side of the optical axis.

According to an advantageous embodiment of the invention, the surfaces able to be illuminated of the first and second complementary optical systems are arranged below the optical axis.

According to an advantageous embodiment of the invention, each of the surfaces able to be illuminated of the first and second complementary optical systems has a mean height H and a mean width L greater than 5 times said mean height H.

According to an advantageous embodiment of the invention, each of the surfaces able to be illuminated of the first and second complementary optical systems comprises an inclined lateral edge able to form the oblique lateral cut-off of the corresponding complementary light beam.

According to an advantageous embodiment of the invention, the inclined lateral edges of the surfaces able to be illuminated of the first and second complementary optical systems are adjacent to the optical axis and arranged laterally on either side of said optical axis.

According to an advantageous embodiment of the invention, the optical element of each of the first and second complementary optical systems is a diopter with an inlet face of the light emitted by the corresponding light source, a reflecting face of said light, and an outlet face of said light, forming the surface able to be illuminated.

According to an advantageous embodiment of the invention, the optical element of each of the first and second complementary optical systems comprises a reflective surface forming the surface able to be illuminated.

According to an advantageous embodiment of the invention, the main optical system comprises a light source with a main direction of emission of light beams which is directed upward, and a collector with a reflective surface in the form of a cap able to receive the light beams and with a lower rear edge adjacent to the optical axis.

According to an advantageous embodiment of the invention, the surfaces able to be illuminated of the first and second complementary optical systems are adjacent to the lower rear edge of the reflective surface of the collector at the optical axis.

According to an advantageous embodiment of the invention, the projection device comprises a focal point situated on the optical axis at the level of the lower rear edge of the reflective surface of the collector or in front of said edge.

The measures of the invention are useful in that they allow creation of a lighting module with a lighting function with upper horizontal cut-off of the low beam type, which is compatible with different regulations and driving sides (driving on the left and driving on the right), in a simple, economic and compact manner.

DETAILED DESCRIPTION OF THE INVENTION

In the description below, the terms "front" and "rear" should be understood following the optical axis of the lighting module in the normal direction of propagation of the light rays. Similarly, the terms "top", "bottom", "horizontal" and "vertical" should be understood when the lighting module is in the operational position, as illustrated in particular in FIGS. 1 and 7.

Figure 1:
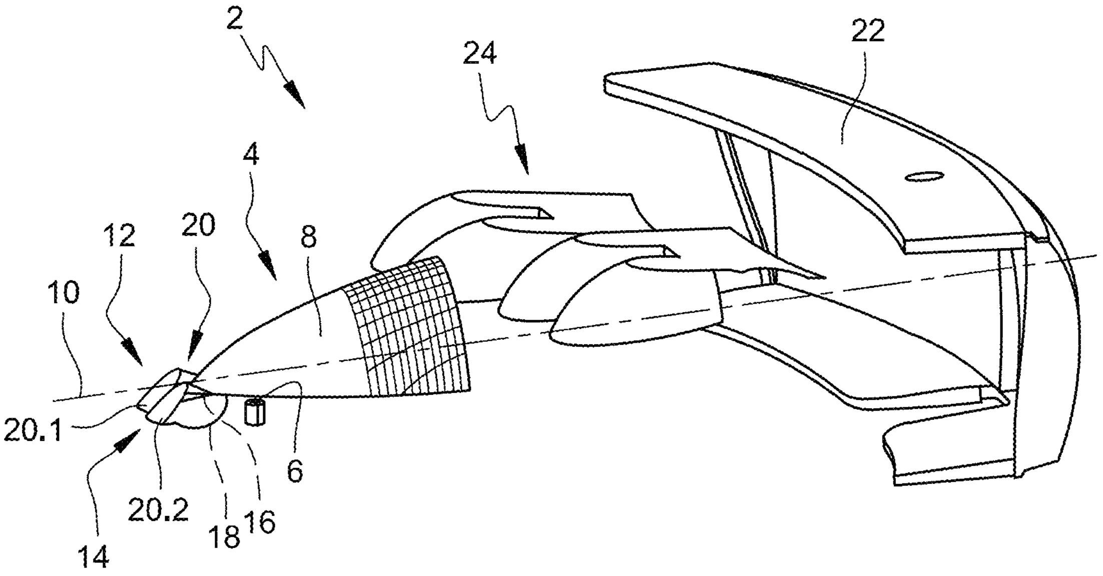
FIG. 1 illustrates a perspective view of a lighting module according to a first embodiment of the invention.

FIG. 1 is a perspective view of a lighting module according to a first embodiment. A lighting module means a unitary assembly, i.e. in which all optical elements are connected together and positioned so as to be able to perform one or more functions of lighting or luminous signaling. Such a module is intended to be mounted in a housing closed by a glazing element, in some cases with one or more other lighting or luminous modules, in order to form a headlight.

The lighting module 2 comprises several optical systems able to form different light beams of one or more lighting functions, in this case a lighting function with upper horizontal cut-off, normally known as low beam, and a lighting function without horizontal cut-off, normally known as high beam. The lighting module 2 comprises a main optical system 4 able to form a main light beam with upper horizontal cut-off, intended to implement a low-beam lighting function. The main optical system 4 essentially comprises a light source 6 and a collector 8 with a reflective surface in the form of a cap, and configured to receive the light rays emitted by said light source and reflect these along the optical axis 10. The lighting module 2 also comprises two complementary optical systems 12 and 14, arranged below the optical axis 10 and configured to form, in an alternative fashion, light beams which are complementary to the main light beam formed by the main optical system 4. Each of these complementary optical systems 12 and 14 substantially comprises a respective light source 16 or 18 and a respective optical element 20.1 or 20.2. In this case, the optical elements 20.1 and 20.2 are unitary and form a common optical element 20. Each of the complementary light beams formed by the complementary optical systems 12 and 14 complements the main light beam by forming an addition at the level of the horizontal cut-off in accordance with regulations in force, in particular in Europe. In practice, the first complementary optical system 12 forms a complementary light beam situated to the right of the optical axis with an oblique lateral cut-off adjacent to the optical axis, so as to form an upward addition to right of the optical axis in accordance with regulations for driving on the right. Similarly, the second complementary optical system 14 forms a complementary light beam situated to the left of the optical axis with an oblique lateral cut-off adjacent to the optical axis, so as to form an upward addition to the left of the optical axis in accordance with regulations for driving on the left.

Still with reference to FIG. 1, the lighting module 2 comprises a projection device 22, in this case a lens, able to image and project the illuminated reflective surface of the collector 8 of the main optical system 4, and an illuminated surface of the optical element 20.1 or 20.2 of the first or second complementary optical system 12 and 14.

Again with reference to FIG. 1, the lighting module 2 may comprise one or more additional optical systems 24 configured to form light beams with upper horizontal cut-off complementing the main light beam produced by the main optical system 4.

Figure 2:
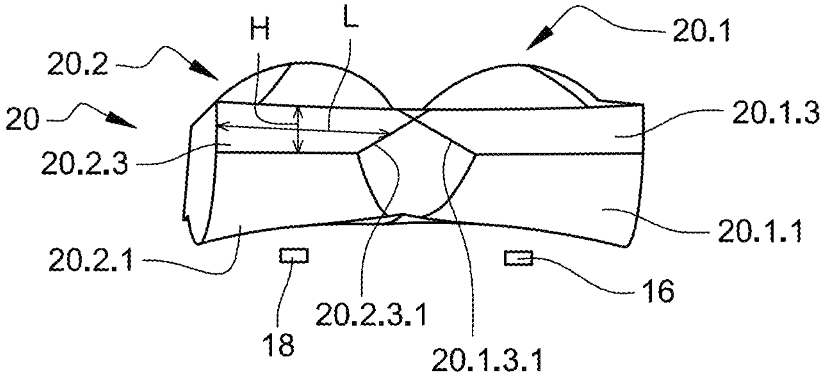
FIG. 2 is a front view of the optical element of the complementary optical systems lighting module from FIG. 1.
Figure 3:
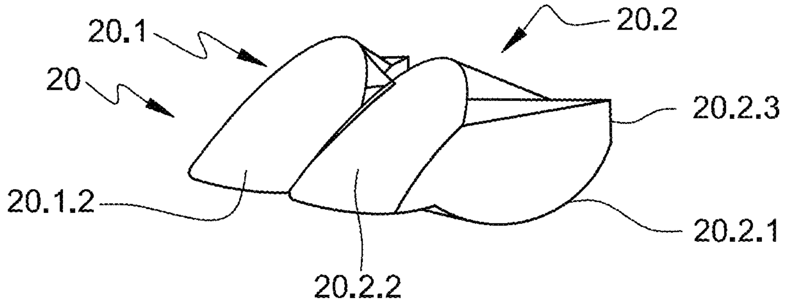
FIG. 3 is a rear view of the optical element from FIG. 2.

FIGS. 2 and 3 show two perspective views of the optical elements 20.1 and 20.2 of the first and second complementary optical systems 12 and 14 (FIG. 1). These two optical elements are made of transparent or translucent material and form diopters, each with an inlet face, a reflective face and an outlet face for the light emitted by the associated light source. The inlet faces 20.1.1 and 20.2.1 have a convexly curved profile in a vertical plane arranged opposite the respective light sources 16 and 18. The reflective faces 20.1.2 and 20.2.2 are the rear faces of the optical elements 20.1 and 20.2, and have a slightly convexly curved profile in a vertical plane. The outlet faces 20.1.3 and 20.2.3 are the front faces of the optical elements 20.1 and 20.2 adjacent to the reflective surface of the collector 8 of the main optical system 4 (FIG. 1). In a horizontal plane, they have a concavely curved surface corresponding to the profile of the adjacent lower rear edge of the reflective surface of the collector 8 of the main optical system 4 (FIG. 1).

With more specific reference to FIG. 2 showing the outlet faces 20.1.3 and 20.2.3, it is observed that each of these faces has a mean width L which is greater than a multiple of the mean height H, for example more than 5 times the mean height H. The complementary light beam imaging such an illuminated face will thus have a corresponding shape, i.e. vertically slim. This image will be reversed when passing through the projection device 22 (FIG. 1). To this end, the inner side edge relative to an optical axis (passing between the two optical elements 20.1 and 20.2, i.e. in the center of the common optical element 20), designated by reference signs 20.1.3.1 and 20.2.3.1, is inclined relative to the vertical, for example by an angle of between 45° and 75° (corresponding to an incline between 45° and 15° relative to the horizontal), so as to form the oblique lateral cut-off of the corresponding complementary light beam.

Figure 4:
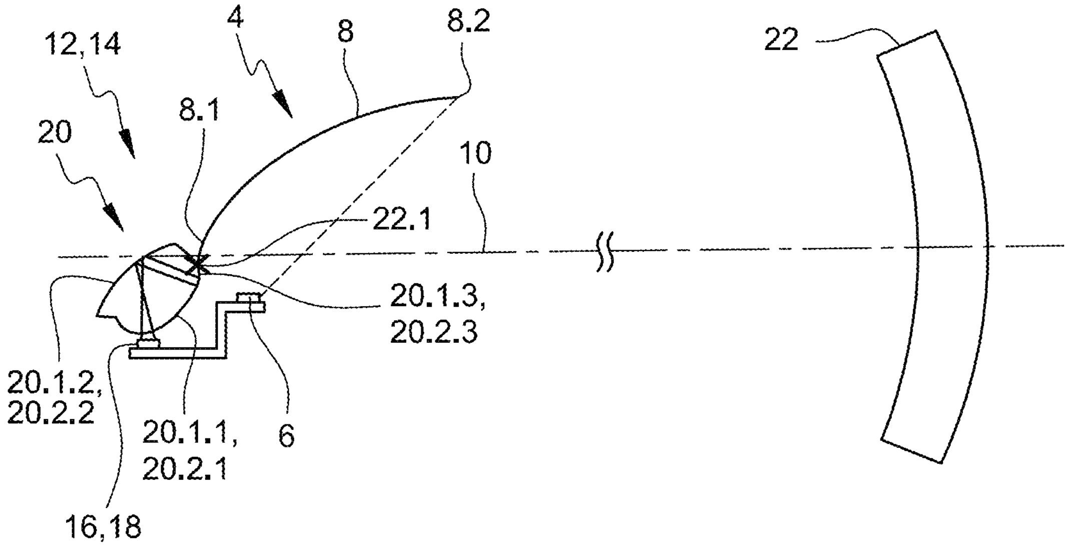
FIG. 4 is a schematic, cross-sectional view of the lighting module from FIG. 1.

FIG. 4 is a schematic, vertical, longitudinal, sectional view of the lighting module from FIG. 1. For the main optical system 4 and the projection device, the section passes through the optical axis 10, whereas for the complementary optical devices 12 and 14, the section is offset perpendicularly to the sectional plane of the main optical system 4 and passes through either one of said complementary optical systems and the corresponding light source.

In the main optical system 4, it is noted that the light source 6 illuminates the reflective surface of the collector 8 from the lower rear edge 8.1 up to the front edge 8.2 of said reflective surface. The projection device 22 comprises a focal point 22.1 situated on the optical axis 10 level with the lower rear edge of 8.1, or a position slightly further forward but still at the level of the collector 8, ideally on a first half of the length of the collector along the optical axis. By means of a certain field depth, this allows the projection device 22 to image the reflective surface of the collector 8 when illuminated, where the zone of the reflective surface along the lower rear edge 8.1 is imaged with clarity so as to achieve a clear upper horizontal cut-off. In order to image the illuminated reflective surface, the main optical system 4 including the projection device 22 must be stigmatic. A rigorous stigmatism is present when, for two points, the set of light rays emitted from one of the points and passing through the system forms other light rays, the supports of which pass through the second point. In practice, this would be rather an approximate stigmatism obtained in particular by existing in Gaussian conditions. These conditions provide that the angles of incidence of the rays relative to the optical axis of the element are low, typically less than or equal to 20°, and/or that the point of incidence is close to the optical axis. To this end, the optical device 22 advantageously has a large focal distance, more advantageously also a large geometric aperture. For example, the focal distance is more than 40 mm, preferably more than 50 mm, more preferably more than 60 mm. The focal distance is advantageously less than 100 mm.

For the complementary optical system 12 or 14, we see the path of the rays emitted by the corresponding light source 16 or 18. These are potentially refracted in the diopter formed by the inlet face 20.1.1 or 20.2.1, then reflected by the reflective face 20.1.2 or 20.2.2, advantageously by the principle of total reflection when the angle of incidence is greater than the limit angle of refraction, and then potentially refracted on passage through the diopter formed by the outlet face 20.1.3 or 20.2.3 which then forms an illuminated surface. This illuminated surface is advantageously adjacent to the optical axis 10 and to the lower rear edge 8.1 of the reflective surface of the collector 8. Therefore, the illuminated surface 20.1.3 or 20.2.3 is adjacent to the focal point 22.2 of the projection device 22, or at least close to this. This illuminated surface is then imaged with clarity which allow creation of a complementary light beam with clear cut-offs.

Figure 5:
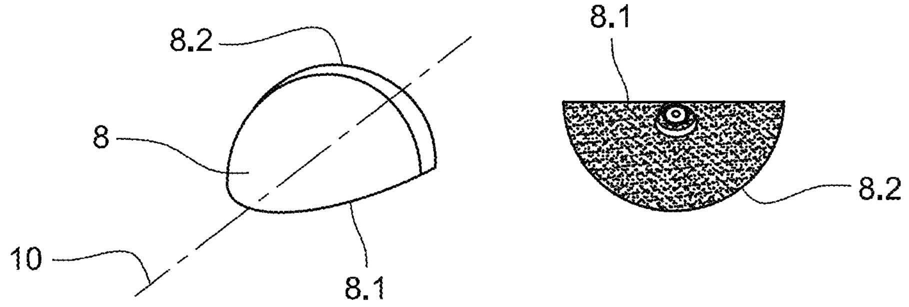
FIG. 5 is a rear view and a front view, via the projection device, of the collector of the lighting module from FIG. 1.

FIG. 5 illustrates the collector 8 of the main optical system 4 (FIGS. 1 and 4). The left-hand view is a perspective view showing the form of the collector cap, advantageously with an elliptical or parabolic profile, advantageously in revolution, at least in a first approximation, about an axis corresponding to the optical axis 10. The right-hand view shows the reflective surface when illuminated by the light source, viewed from the front of the projection device 22 (FIGS. 1 and 4). This causes an image inversion effect which explains why the image of the lower rear edge 8.1 of the reflective surface in fact forms the upper horizontal edge of the projected image. Similarly, the front edge 8.2 of the reflective surface forms the lower edge of the projected image. It is noted that the light is concentrated in the middle of the surface close to the lower rear edge. With reference to FIG. 4, the fact that the focal point 22.1 of the projection device lies on the optical axis and close to or adjacent to the lower rear edge 8.1 of the reflective surface of the collector 8, means that the central part of the reflective surface close to said edge will be imaged with even more clarity. Under these conditions, the upper horizontal cut-off of the main light beam will be clearer in the center than at the edges.

Figure 6:
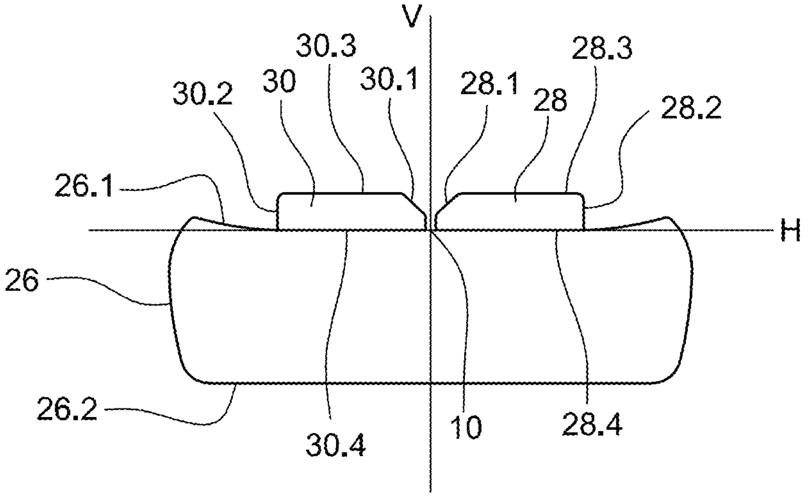
FIG. 6 is a schematic illustration of the luminous images of the light beams of the lighting module from FIG. 1.

FIG. 6 illustrates schematically the images of the main and complementary light beams. Axis H corresponds to the horizontal direction passing through the optical axis, and axis V corresponds to the vertical direction also passing through the optical axis.

The image of the main light beam 26 comprises an upper horizontal cut-off 26.1 which is generally flat or straight. It is formed by the image of the lower rear edge 8.1 of the reflective surface of the collector 8 of the main optical system 4 (FIGS. 4 and 5). It is however noted that this upper horizontal cut-off 26.1 could also have a non-flat profile, if the lower rear edge 8.1 of the reflective surface of the collector 8 is not flat. The image of the main light beam 26 comprises a lower U-shaped cut-off 26.2, which is not as clear as the upper horizontal cut-off 26.1 formed by the front edge 8.2 of the reflective surface of the collector 8 (FIGS. 4 and 5).

The image of the first complementary light beam 28 situated to the right of the optical axis 10 (at the intersection of the axes H and V) is produced by the first complementary optical system 12 (FIG. 1) situated to the left of the optical axis. The figure shows the oblique lateral cut-off 28.1 adjacent to the optical axis 10, the outer lateral cut-off 28.2, and the upper 28.3 and lower 28.4 horizontal cut-offs. These four cut-offs are formed by the side, upper and lower edges of the illuminated surface formed by the outlet face 20.1.3 of the corresponding diopter 20.1 (FIG. 2), given that the images are inverted, corresponding to a rotation of 180° about the optical axis 10. Similarly, the image of the second complementary light beam 30 situated to the left of the optical axis 10 is produced by the second complementary optical system 14 (see FIG. 1), situated to the right of the optical axis. It also comprises an oblique lateral cut-off 30.1 adjacent to the optical axis 10, an outer lateral cut-off 30.2, and upper 30.3 and lower 30.4 horizontal cut-offs.

The combination of the main light beam 28 with the first complementary light beam 28 corresponds to a lighting function known as low beam for driving on the right in accordance with regulations in force in Europe in particular. Similarly, the combination of the main light beam 26 with the second complementary light beam 30 corresponds to a lighting function known as low beam for driving on the left in accordance with the same regulations. The main light beam 26 alone may correspond to a lighting function known as low beam in accordance with regulations in force in the United States of America.

Figure 7:
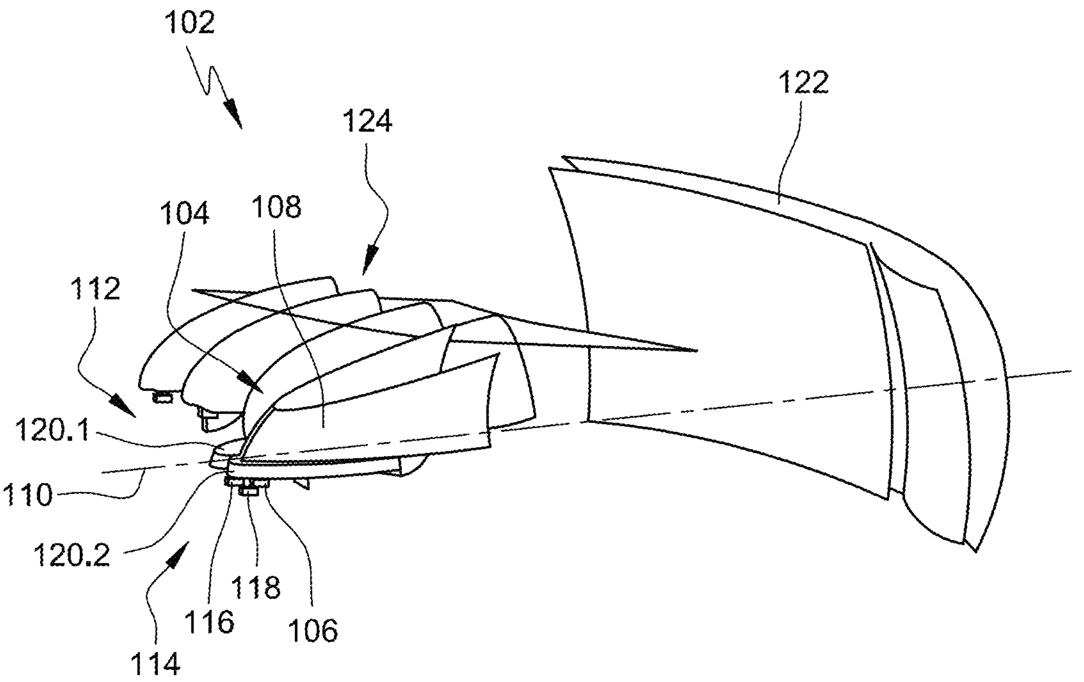
FIG. 7 is a perspective view of a lighting module according to a second embodiment of the invention.
Figure 8:
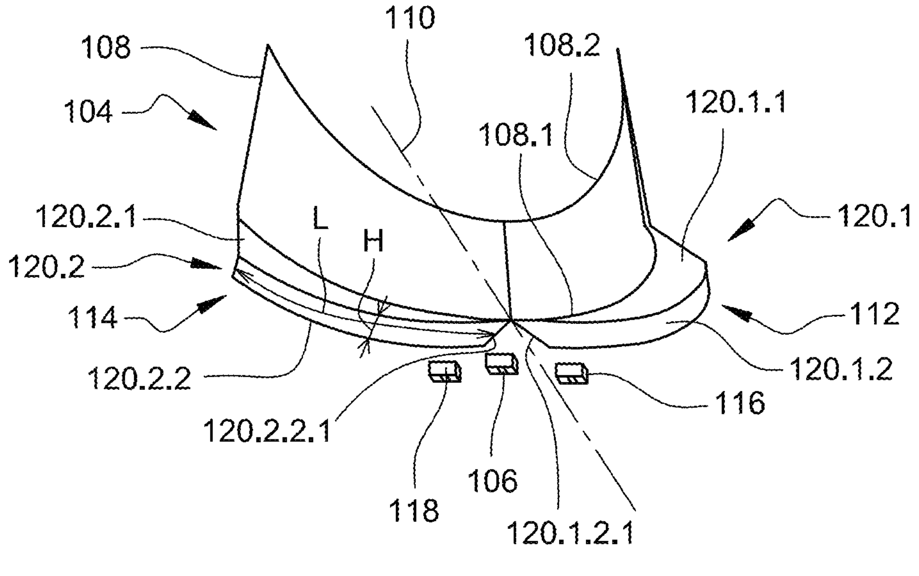
FIG. 8 is a perspective view of the collector of the main optical system and of the optical element of the complementary optical systems of the lighting module from FIG. 7.

FIGS. 7 and 8 illustrate a light module according to a second embodiment of the invention. The reference numbers of the first embodiment have been used to designate corresponding or identical elements, these numbers however being increased by 100. Reference is also moreover made to the description of these elements that was given with regard to the first embodiment. Specific numbers between 100 and 200 are used to designate specific elements.

FIG. 7 illustrates schematically in perspective a lighting module 102 similar to that of the first embodiment. It differs essentially in the structure of the complementary optical systems 112 and 114, the optical elements 120.1 and 120.2 of which are no longer dioptric elements but reflectors. Similarly to the first embodiment, the main optical system 104 produces a main light beam with an upper horizontal cut-off, preferably flat, and the complementary optical systems 112 and 114 produce complementary light beams situated respectively to the right and left of the optical axis, with an oblique lateral cut-off adjacent to the optical axis.

FIG. 8 is a perspective view of the main optical system 104 and the first and second complementary optical systems 112 and 114 respectively.

The collector 108 of the main optical system 104 comprises a reflective surface in the form of a cap with a lower rear edge 108.1 adjacent to the optical axis 110, and a front edge 108.2 which corresponds in this case to a truncation of the cap by an upper plane close to a horizontal orientation. The light source 106 is configured to illuminate this reflective surface, which is imaged by the projection device 122 (FIG. 1) to form the main beam with an upper horizontal cut-off formed by the essentially clear image of the lower rear edge 108.1 of the reflective surface concerned. The more or less clear image of the front edge 108.2 then forms the lower limit of the main light beam. The reflectors 120.1 and 120.2, which form optical elements of the first and second complementary optical systems 112 and 114, are adjacent to the lower rear edge 108.1 of the reflective surface of the collector 108 of the main optical system 104. Each of the reflectors 120.1 and 120.2 comprises a first reflective surface 120.1.1 or 120.2.1 extending substantially horizontally from the lower rear edge 108.1 of the reflective surface of the collector 108 of the main optical system 104, and a second reflective surface 120.1.2 or 120.2.2 extending substantially vertically from the first reflective surface 120.1.1 or 120.2.1. Each of the second reflective surfaces 120.1.2 or 120.2.2 point has in the horizontal plane a concavely curved profile of greater mean radius than the lower rear edge 108.1 of the reflective surface of the collector 108 of the main optical system 104. The reflectors 120.1 and 120.2 are configured to collect the light emitted by the light sources 116 and 118 respectively, so as to illuminate the second reflective surfaces 120.1.2 and 120.2.2 respectively. These are comparable to the illuminated surfaces of the diopters 20.1 and 20.2 of the first embodiment, formed by the outlet faces 20.1.3 and 20.2.3 of said diopters (see FIG. 2). Each of these second reflective surfaces 120.1.2 or 120.2.2 extends horizontally, with a mean width L greater than a multiple, for example 5 or 10, of the mean height H. Each of these surfaces has an inclined lateral edge 120.1.2.1 or 120.2.2.1 adjacent to the optical axis 110, so as to form an oblique lateral cut-off edge of the corresponding complementary light beam. Similarly to the first embodiment, the projection device 122 images these illuminated reflective surfaces in order to form complementary light beams similar to the complementary light beams 28 and 30 of the first embodiment (FIG. 6).

In general, i.e. in particular for the two embodiments, the light source of the main optical system and the light sources of the complementary optical systems may be arranged on a common support because of their proximity and the fact that they all emit light in the same direction.

In view of the above, it will be understood that the complementary optical systems may take various forms, provided that they are configured to form alternative complementary light beams with opposite oblique lateral cut-offs which, together with the main light beam with upper horizontal cut-off of advantageously flat profile, are able to form an upper horizontal cut-off with an addition in the center in accordance with regulations in force in Europe in particular.

In view of the above, it will also be understood that the main optical system may also take various forms insofar as it produces a light beam with upper horizontal cut-off which is advantageously flat.

The invention which has just been described is advantageous in that it allows production of a single lighting module for a low beam lighting function which is compatible with various regulations, such as European regulations, with a specific addition for driving on the left and for driving on the right, and American regulations without addition. Conformity with the regulations to be observed is then achieved by specific activation of one or neither complementary optical system.

What is claimed is:

1. A lighting module of a motor vehicle, comprising:

a main optical system configured to form a main light beam along an optical axis of the lighting module with an upper horizontal cut-off;

a first complementary optical system configured to form a first complementary light beam along the optical axis, narrower than the main light beam and with a first oblique lateral cut-off; and a second complementary optical system configured to form a second complementary light beam along the optical axis, narrower than the main light beam and with a second oblique lateral cut-off, the first oblique lateral cut-off being opposite the second oblique lateral cut-off;

wherein the main optical system includes a light source with a main direction of emission of a number of main light beams directed upward;

a reflective surface of a collector in the form of a cap configured to receive said main light beams and with a lower rear edge adjacent to the optical axis; and an optical element of the second complementary optical system where an inlet face has a convexly curved profile arranged opposing the light source.

2. A lighting module for a motor vehicle, comprising:

a main optical system able to form a main light beam along an optical axis of the lighting module, with an upper horizontal cut-off;

where the main optical system includes a light source with a main direction of emission of light beams which is directed upward;

where a reflective surface of a collector is configured to receive the light beams and with a lower rear edge adjacent to the optical axis;

a first complementary optical system configured to form a first complementary light beam along the optical axis, narrower than the main light beam with a first oblique lateral cut-off;

a second complementary optical system configured to form a second complementary light beam along the optical axis;

the second complementary light beam being narrower than the main light beam and including a second oblique lateral cut-off;

the first oblique lateral cut-off opposing the second oblique lateral cut-off where each of the first and second optical systems includes a light source and an optical element with a surface to be illuminated by the light source;

each optical element of the first and second complementary optical system is a diopter with an inlet face of the light emitted by each corresponding light source;

a reflecting face and an outlet face forming the surface configured to be illuminated; and a projection device, the projection device including a focal point situated on the optical axis at a level of the lower rear edge of the reflective surface of the collector or in front of the lower rear edge;

the projection device projecting the first and second complementary light beams and being configured to form an image of the surface being illuminated of each optical element for the first and second complementary optical systems.

3. The lighting module of claim 2, wherein each surface being illuminated of the first and second complementary optical systems includes an inclined lateral edge able to form the oblique lateral cut-off of the corresponding complementary light beam.

4. The lighting module of claim 3, wherein inclined lateral edges of each surface being illuminated of the first and second complementary optical systems are adjacent to the optical axis and arranged laterally on either side of said optical axis.

5. The lighting module of claim 2, where the collector is in the form of a cap.

6. The lighting module of claim 5, where each surface being illuminated of the first and second complementary optical systems are adjacent to the lower rear edge of the reflective surface of the collector.

7. The lighting module of claim 2, wherein the first oblique lateral cut-off and the second oblique lateral cut-off are adjacent to the optical axis, with the first complementary light beam extending exclusively to the right of the optical axis and the second complementary light beam extending exclusively to the left of the optical axis.

8. The lighting module as claimed in claim 2, wherein the lighting module is configured such that the first and second complementary optical systems are only active alternatively.

9. The lighting module of claim 2, where each surface being illuminated of the first and second complementary optical systems are arranged laterally on either side of the optical axis.

10. The lighting module of claim 2, where each surface being illuminated of the first and second complementary optical systems are arranged below the optical axis.

11. The lighting module of claim 2, wherein each surface being illuminated of the first and second complementary optical systems has a mean height and a mean width, with the mean width being greater than five times the mean height.

12. A lighting module of a motor vehicle, comprising:

a main optical system configured to form a main light beam along an optical axis of the lighting module with an upper horizontal cut-off, the main optical system including a collector with a reflective surface;

a first complementary optical system adapted to form a first complementary light beam along the optical axis;

the first complementary light beam being narrower than the main light beam and including a first oblique lateral cut-off;

a second complementary optical system configured to form a second complementary light beam along the optical axis;

the second complementary light beam being narrower than the main light beam and including a second oblique lateral cut-off;

the first oblique lateral cut-off opposing the second oblique lateral cut-off where each of the first and second complementary optical systems includes a light source and an optical element with a surface to be illuminated by the light source;

each optical element of the first and second complementary optical systems includes a reflective surface configured to form the illuminated surface;

a projection device includes a focal point situated on the optical axis at a level of a lower rear edge of the reflective surface of the collector or in front of the lower rear edge of the reflective surface of the collector of the main optical system;

and the projection device projecting first and second complementary light beams and being configured to form an image of the surface being illuminated of each optical element for the first and second complementary optical systems.

13. The lighting module of claim 12, wherein each illuminated surface of the first and second complementary optical systems includes an inclined lateral edge able to form the oblique lateral cut-off of the corresponding complementary light beam.

14. The lighting module of claim 13, wherein inclined lateral edges of each illuminated surface of the first and second complementary optical systems are adjacent to the optical axis and arranged laterally on either side of said optical axis.

15. The lighting module of claim 12, wherein the first oblique lateral cut-off and the second oblique lateral cut-off are adjacent to the optical axis, with the first complementary light beam extending exclusively to the right of the optical axis and the second complementary light beam extending exclusively to the left of the optical axis.

16. The lighting module of claim 12, wherein the lighting module is configured such that the first and second complementary optical systems are only active alternatively.

17. The lighting module of claim 12, wherein each illuminated surface of the first and second complementary optical systems has a mean height and a mean width, with the mean width being greater than five times the mean height.

18. The lighting module of claim 12, wherein each illuminated surface of the first and second complementary optical systems are adjacent to the lower rear edge of the reflective surface of the collector.

* * * * *